(12) United States Patent
Lu et al.

(10) Patent No.: US 11,137,164 B2
(45) Date of Patent: Oct. 5, 2021

(54) CONTROL SYSTEMS AND METHODS FOR HEAT PUMP SYSTEMS

(71) Applicant: Carrier Corporation, Palm Beach Gardens, FL (US)

(72) Inventors: Tony Lu, Manlius, NY (US); David Gerald Kenyon, Carmel, IN (US); Junqiang Fan, Glastonbury, CT (US); Kevin Mercer, Danville, IN (US); Jie Li, Zionsville, IN (US); Massimiliano D'Angelo, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 69 days.

(21) Appl. No.: 16/611,696

(22) PCT Filed: May 15, 2018

(86) PCT No.: PCT/US2018/032664
§ 371 (c)(1),
(2) Date: Nov. 7, 2019

(87) PCT Pub. No.: WO2018/213243
PCT Pub. Date: Nov. 22, 2018

(65) Prior Publication Data
US 2020/0158370 A1    May 21, 2020

Related U.S. Application Data

(60) Provisional application No. 62/506,049, filed on May 15, 2017.

(51) Int. Cl.
*F24F 11/84* (2018.01)
*F25B 30/02* (2006.01)
(Continued)

(52) U.S. Cl.
CPC .............. *F24F 11/84* (2018.01); *F25B 30/02* (2013.01); *F25B 41/31* (2021.01); *F24F 11/46* (2018.01)

(58) Field of Classification Search
CPC . F24F 11/46; F24F 11/84; F25B 30/02; F25B 41/31
See application file for complete search history.

(56) References Cited

U.S. PATENT DOCUMENTS 4,959,975 A  *  10/1990  Harris ...................... F24H 4/04
                                                                     62/238.6
5,381,669 A      1/1995  Bahel et al.
(Continued)

FOREIGN PATENT DOCUMENTS

| EP | 2515056 A2 | 10/2012 |
| EP | 3056841 A1 | 8/2016 |
| KR | 100927072 B1 | 11/2009 |

OTHER PUBLICATIONS

International Search Report, International Application No. PCTUS2018/032664, dated Jul. 25, 2018, European Patent Office; International Search Report 5 pages.
(Continued)

*Primary Examiner* — Henry T Crenshaw
(74) *Attorney, Agent, or Firm* — Cantor Colburn LLP

(57) ABSTRACT

Heat pump systems and methods of operating including a first unit having a first unit heat exchanger, a compressor, an accumulator, and a first unit expansion valve, a second unit fluidly connected to the first unit by piping, the second unit having a second unit heat exchanger, and a system controller, the system controller having (I) a PID control element receiving as inputs (i) gain scheduling, (ii) an error signal, and (iii) feedback relating to an opening command of the first unit expansion valve, and (II) a feedforward control element generating a feedforward term that is combined
(Continued)

with an output of the PID control element to generate the opening command of the first unit expansion valve. The system controller controls an opening of the first unit expansion valve using the opening command of the first unit expansion valve.

9 Claims, 2 Drawing Sheets

(51) Int. Cl.
  *F25B 41/31* (2021.01)
  *F24F 11/46* (2018.01)

(56) References Cited

U.S. PATENT DOCUMENTS

| | | | |
|---|---|---|---|
| 5,394,322 A | 2/1995 | Hansen | |
| 5,598,717 A * | 2/1997 | Sakamoto | F24F 11/30 62/211 |
| 5,632,154 A * | 5/1997 | Sibik | F25B 41/31 62/99 |
| 5,809,794 A | 9/1998 | Sibik et al. | |
| 6,016,966 A | 1/2000 | Inoue | |
| 6,059,027 A | 5/2000 | Lake et al. | |
| 6,077,158 A | 6/2000 | Lake et al. | |
| 6,089,034 A | 7/2000 | Lake et al. | |
| 6,118,099 A | 9/2000 | Lake et al. | |
| 6,276,152 B1 | 8/2001 | Sibik | |
| 6,470,225 B1 | 10/2002 | Yutkowitz | |
| 6,577,908 B1 | 6/2003 | Wojsznis et al. | |
| 6,688,124 B1 | 2/2004 | Stark et al. | |
| 6,721,609 B1 | 4/2004 | Wojsznis et al. | |
| 6,854,285 B2 | 2/2005 | Jessen | |
| 7,096,093 B1 | 8/2006 | Hansen et al. | |
| 7,599,759 B2 | 10/2009 | Zugibe et al. | |
| 9,348,325 B2 | 5/2016 | Salsbury et al. | |
| 2002/0162344 A1 | 11/2002 | Reason et al. | |
| 2005/0066674 A1 * | 3/2005 | Hirota | F25B 49/022 62/222 |
| 2008/0216500 A1 | 9/2008 | Chen et al. | |
| 2010/0204840 A1 | 8/2010 | Sun et al. | |
| 2011/0132007 A1 | 6/2011 | Weyna et al. | |
| 2012/0102980 A1 * | 5/2012 | Benouali | F25B 41/31 62/56 |
| 2012/0118986 A1 | 5/2012 | Dazai et al. | |
| 2012/0260678 A1 | 10/2012 | Yoshida | |
| 2012/0266623 A1 | 10/2012 | Patel et al. | |
| 2012/0279236 A1 * | 11/2012 | Douglas | F25B 41/31 62/56 |
| 2013/0091885 A1 * | 4/2013 | Park | F25B 29/003 62/238.6 |
| 2014/0123698 A1 * | 5/2014 | Zhang | B60H 1/3229 62/527 |
| 2016/0084553 A1 | 3/2016 | Seki et al. | |
| 2016/0200176 A1 | 7/2016 | Stanke et al. | |
| 2016/0377333 A1 | 12/2016 | Bertagnolio et al. | |
| 2017/0030622 A1 | 2/2017 | Olukoju | |
| 2017/0038108 A1 | 2/2017 | Mercer | |
| 2017/0044997 A1 | 2/2017 | Nakagawa et al. | |

OTHER PUBLICATIONS

International Written Opinion, International Application No. PCTUS2018/032664, dated Jul. 25, 2018, European Patent Office; International Written Opinion 7 pages.

* cited by examiner

CONTROL SYSTEMS AND METHODS FOR HEAT PUMP SYSTEMS

CROSS REFERENCE TO RELATED APPLICATIONS

This is a U.S. National Stage of Application No. PCT/US2018/032664, filed on May 15, 2018, which claims the benefit of U.S. Provisional Patent Application No. 62/506,049, filed on May 15, 2017, the disclosures of which are incorporated herein by reference in their entireties.

BACKGROUND

The subject matter disclosed herein generally relates to heat pumps and, more particularly, to control systems and methods a controlling expansion valves of heat pumps, Electronic control systems exist for air conditioners, heat pumps, and/or refrigeration equipment. Digital circuitry can be employed for controlling the systems, including the operational speed of various components and/or various valves, based on environmental measurements, to optimize heating and cooling efficiencies and improve occupant comfort. For example, expansion valves can be controlled to present compressor flooding. Further, accumulators can be installed within systems to receive a portion of a working fluid to prevent flooding, damage, or reduced efficiencies associated with a compressor of the system. The heating and cooling industry strives to improve the efficiency of air-conditioning and heat pump systems. System efficiency is a multifaceted concept, with various alterations enabling different efficiency and/or operational life.

SUMMARY

According to some embodiments, heat pump systems are provided. The heat pump systems include a first unit having a first unit heat exchanger, a compressor, an accumulator, and a first unit expansion valve, a second unit fluidly connected to the first unit by piping, the second unit having a second unit heat exchange r and a system controller, the system controller having (I) a proportional-integral-derivative controller ("PID control element") receiving as inputs (i) gain scheduling, (iii an error signal, and (iii) feedback relating to an opening command of the first unit expansion valve, and (II) a feedforward control element generating a feedforward term that is combined with an output of the PID control element to generate the opening command of the first unit expansion valve. The system controller controls an opening of the test unit expansion valve using the opening command of the first unit expansion valve.

In addition to one or more of the features described herein, or as an alternative, further embodiments of the heat pump systems may include that the first unit expansion valve is an electric expansion valve.

In addition to one or more of the features described herein, or as an alternative, further embodiments of the heat pump systems may include that the second unit further comprises a second unit expansion valve.

In addition to one or more of the features described herein, or as an alternative, further embodiments of the heat pump systems may include that the second unit expansion valve is a thermostatic expansion valve.

In addition to one or more of the features described herein, or as an alternative, further embodiments of the heat pump systems may include that the first unit and the second unit are arranged in a common enclosure.

In addition to one or more of the features described herein, or as an alternative, further embodiments of the heat pump systems may include that the gain scheduling receives an outdoor ambient temperature as an input.

In addition to one or more of the features described herein, or as an alternative, further embodiments of the heat pump systems may include that the feedforward control element receives a compressor speed as an input.

According to some embodiments, methods of controlling heat pump systems are provided. The methods include receiving, at a PID control element, (i) gain scheduling inputs, (ii) an error signal, and (iii) feedback related to an opening command of a first unit expansion valve, generating a feedforward term at a feedforward control element, combining the feedforward term with an output of tire PID control element to generate the opening command of the first unit expansion valve, and controlling an opening or closing of a first unit expansion valve based on the opening command of the first unit expansion valve.

In addition to one or more of the features described herein, or as an alternative, further embodiments of the methods may include that the gain scheduling input is based on an outdoor ambient temperature.

In addition to one or more of the features described herein, or as an alternative, further embodiments of the methods may include that the feedforward term is based on a compressor speed.

The foregoing features and elements may be combined in various combinations without exclusivity, unless expressly indicated otherwise. These features and elements as well as the operation thereof will become more apparent in light of the following description and the accompanying drawings, it should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
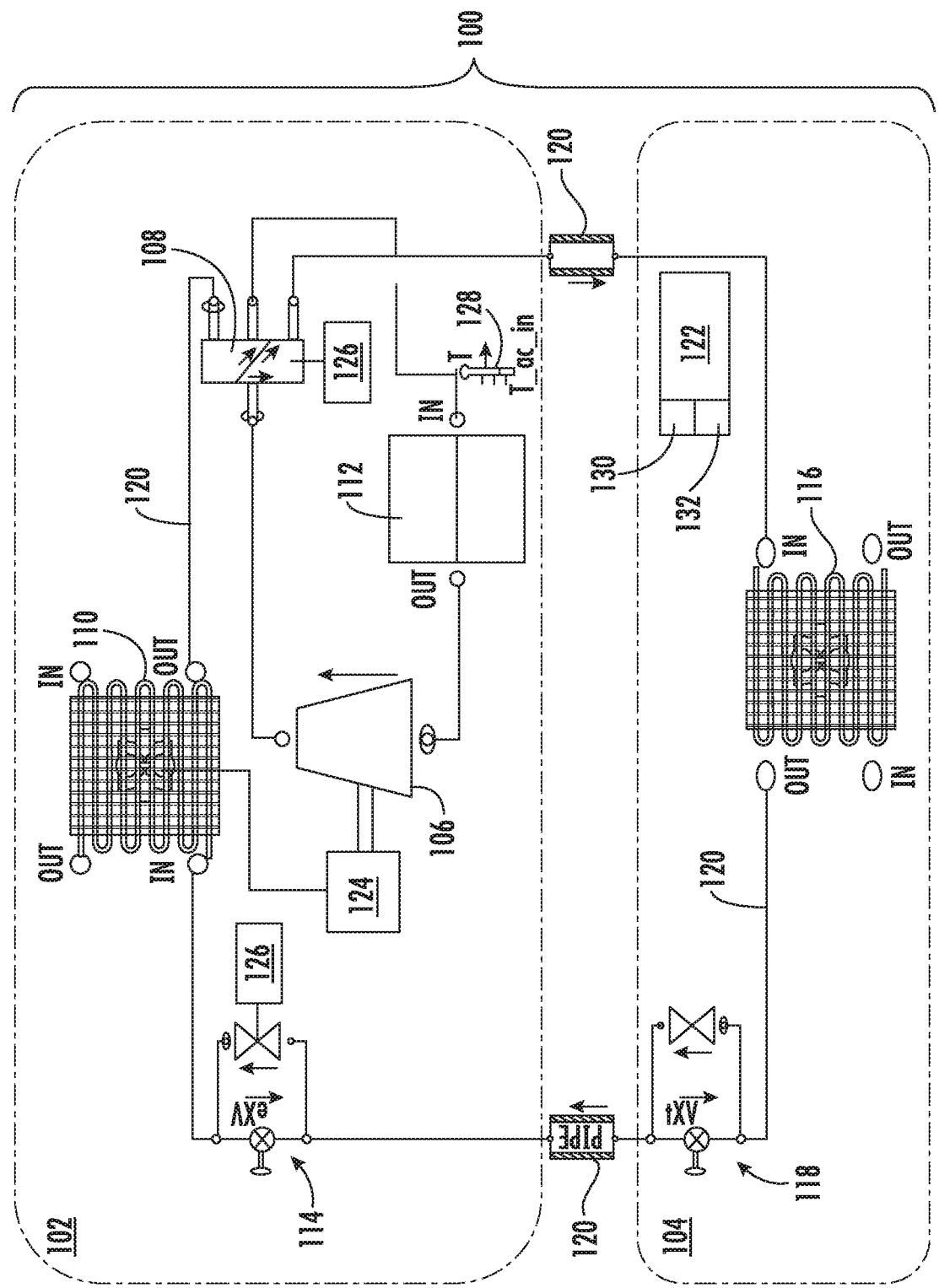
FIG. 1 is a schematic diagram of a heat pump system in accordance with an embodiment of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a schematic illustration of a heat pump system 100 in accordance with an embodiment of the present disclosure and incorporates features necessary to practice processes described herein. Although the term "heat pump system" is employed herein, those of skill in the art will appreciate that the term is inclusive of air conditioning systems as well. The heat pump system 100 includes a first unit 102 and a second unit 104. The first unit 102 can be an outdoor unit of the heat pump system 100 and the second unit 104 can be an indoor unit of the heat pump system 100 that is used to condition air within a space (e.g., room, building, etc.). In the embodiment shown, the first unit 102 includes a compressor 106, a reversing valve 108, a first unit heat exchanger 110, an accumulator 112, and a first unit expansion valve 114. The accumulator 122 is used to store excessive fluid, when necessary, to protect the compressor 106 from flooding.

The first unit expansion valve 114, in accordance with various embodiments of the present disclosure is an electric expansion valve. In the embodiment shown, the second unit 104 includes a second unit heat exchanger 116 and a second unit expansion valve 118. The second unit expansion valve 118, in accordance with various embodiments of the present disclosure is a thermostatic expansion valve. The various components of the first and second units 102, 104 are interconnected by an appropriate system of refrigerant piping 120. Although a specific arrangement is shown in FIG. 1, those of skill in the art will appreciate that other heat pump systems are possible without departing from the scope of the present disclosure. For example, in one non-limiting embodiment, the first unit 102 and the second unit 104 can be housed in a single or common enclosure, such as "small package" heat pump systems. Thus, the present illustration and description is not to be limiting, but rather is provided for illustrative and discussion purposes.

In a heating mode of operation, reversing valve 108 is aligned so that refrigerant flows from the first unit 102, and specifically a discharge end of the compressor 106, through the reversing valve 108 to the second unit heat exchanger 116 of the second unit 104. The second unit heat exchanger 116, in this mode of operation, functions as a condenser. The refrigerant then continues flowing through the piping 120 through the first and second unit expansion valves 114, 118. The refrigerant then flows into and through the first unit heat exchanger 110, which functions as an evaporator. The refrigerant then completes the circuit by flowing through the reversing valve 108 to a suction end of the compressor 106.

In a cooling and/or defrost mode of operation, the reversing valve 108 is aligned so that the refrigerant flows from the discharge end of the compressor 106 through reversing valve 108 to the first unit heat exchanger 110. In this mode of operation, the first unit heat exchanger 110 functions as a condenser. The refrigerant then passes through the first and second unit expansion valves 114, 118 and into and through the second unit heat exchanger 116. In this mode of operation, the second unit heat exchanger 116 functions as an evaporator. The refrigeration completes the circuit by flowing into and through the reversing valve 108 and to the suction end of the compressor 106.

In accordance with some embodiments, and as will be appreciated by those of skill in the art, each of first and second unit expansion valves 114, 118 is a single device or a combination of devices offering little or no resistance to refrigerant flow in one direction and metering or restricting refrigerant flow in the other direction. The devices are installed so that the one directly upstream in the refrigerant flow path from the heat exchanger that is functioning as the evaporator is metering or restricting flow while the other device is offering low flow resistance.

The heat pump system 100 includes a system controller 122 that is arranged to control operation of the heat pump system 100 and various elements or components thereof. The system controller 122 can be one or a combination of components, including microprocessor(s) and/or memory, that are configured to control the operation of the heat pump system 100, including, but not limited to, elements as described herein. The system controller 122 may be in communication with a user device or input device (e.g., thermostat, wall unit/control, smartphone, smart home device, computer, HVAC system controller, etc.) that is used to set a desired temperature within a space that is air conditioned and/or heated by the second unit 104 of the heat pump system 100. Various components that can be controlled by the system controller 122 include the compressor 106 (e.g, speed) and/or the first and second unit expansion valves 114, 118 (e.g., flow direction restrictions). The heat pump system 100 can include various sensors, including temperature sensors, pressure sensors, flow sensors, etc. as will be appreciated by those of skill in the art.

As shown, the compressor 106 is driven by an inverter-driven motor 124 that can operate over a wide range of speeds. The operational characteristics of the inverter-driven motor 124 enables control of the compressor 106 to operate or function as a variable capacity heating or cooling system. This enables the heat pump system 100 to condition a space over a wide range of load conditions while utilizing minimum energy usage. Users of the heat pump system 100 will tend to run or operate the system and thus the compressor 106 for long periods of time at just the correct level to satisfy the load needs, instead of cycling on and off a much larger capacity. The energy usage for maintaining comfort is minimized while the change in temperature in the conditioned space is also minimized. The inverter-driven motor 124 may also be operationally connected to a fan of the first unit heat exchanger 110.

The inverter unit (e.g., inverter-driven motor 124) contains all necessary high voltage systems and components for operating the compressor 106 and the fan motor of the first unit heat exchanger 110. The system controller 122 can interpret system capacity demands and direct the compressor 106 at an optimal speed utilizing model specific parameters and protocols programmed in memory of the system controller 122. The system controller 122 can monitor temperature sensors, suction sensors, safety pressure switches, etc. as additional inputs to controlling algorithms performed by the system controller 122. The system controller 122 generates outputs that control the reversing valve 108 and the first unit expansion valve 114 with one or more stepper motor drives 126, as schematically shown.

As noted above, in operation during a heating mode, the first unit heat exchanger 110 acts as an evaporator while the second unit heat exchanger 116 acts as a condenser. The high temperature, high pressure refrigerant vapor will release heat through coils of the second unit heat exchanger 116 and transition to a high pressure liquid/two-phase mixture, the pressure of the refrigerant will reduce as the refrigerant passes through the first unit expansion valve 114. The low pressure refrigerant then flows into coils of the first unit heat exchanger 110 (e.g., evaporator) where the refrigerant absorbs heat and transitions to a low-pressure gas. The low-pressure, hot vapor flows to the compressor 106 through the piping 120 after passing through the reversing, valve 108 and the accumulator 112 to complete a single cycle.

A superheat signal is monitored by a superheat sensor 128 (e.g., one of the sensors in operable communication with the system controller 122) that is positioned upstream or before the accumulator 112. The superheat signal can be monitored to force the first unit expansion valve 114 open or closed (e.g., monitored to control at valve opening) so that a proper position of the first unit expansion valve 114 will keep the heat pump system 100 running at high efficiency and have improved reliability. With proper control by the system controller 122, the first unit expansion valve 114 can be configured (with the system controller 122) to ensure that all the refrigerant liquid will turn to low pressure vapor through the coils of the first unit heat exchanger 110 operating; as an evaporator) with the right superheat. It will be appreciated by those of skill in the art that poor control of or a malfunctioning first unit expansion valve 114 that opens improperly can enable some amount of refrigerant into the accumulator 112.

As will be appreciated by those of skill in the art, a traditional control algorithm may have efficiency and/or reliability drawbacks when the heat pump system jumps two stages or more (e.g., stages of compressor operation). Under prior control algorithms, the first unit expansion valve (e.g., electronic expansion valve) was forced to open based on preset conditions, i.e., full open. In such a scenario, a large amount of liquid can flood into the accumulator 112. Such accumulator flooding may reduce the efficiency of the heat pump system 100 by requiring, time and/or energy to boil off the fluids within the accumulator 112.

Accordingly, embodiments provided herein are directed to preventing flooding of the accumulator 112. Embodiments described herein incorporate a proportional-integral-derivative controller ("PID controller") with detailed tailoring for heat pump application with gain scheduling and feedforward techniques. Advantageously, embodiments provided enable maintaining superheat control at all times and eliminates any need to jump to a preset operation at same or identical conditions. In various embodiments, the PID controller can be integrated into the system controller 122, the inverter-driven motor 124, and/or be a separate control element or component that controls operation of the speed of operation of the compressor 106.

In operation, the speed of the compressor 106 is driven by the system controller 122 based on a temperature control setting that is received from a user or input device. Based on the temperature control setting, there is a first control loop ("compressor speed control loop") to manipulate the compressor speed to control the return supply air temperature to meet the heating/cooling capacity demand. As will be appreciated by those of skill in the art, the compressor speed corresponds to the stage requested by the user/input device and ambient air temperature (e.g., at first unit 102) and is established apriori to deliver an expected capacity.

The first unit expansion valve 114 is controlled by the system controller 122 to be either set to a preset value or is actively controlled to maintain a target superheat. Typically, when controlling to a target superheat, a feedback approach is employed, which is reactive and cannot anticipate a major but known, future disturbance to the control loop of the first unit expansion valve 114 (e.g., electronic expansion valve control loop or EXV control loop). A change in compressor speed can have a dynamic causal effect on superheat that is much faster than the reactive capability of a feedback control, and thus may not be adequately compensated for during a compensation operation.

Accordingly, to provide a more efficient and faster acting system, embodiments of the present disclosure are directed to a feedforward control system and operation such that feedforward control from a compressor speed is employed to anticipate and attenuate the compressor speed impact to the first unit expansion valve control loop. A feedforward control element 130 can be implemented within the system controller 122 (as schematically shown in FIG. 1) or may be a separate element or component that is configured with the first unit expansion valve 114 (e.g., electronic expansion valve). In some embodiments, the feedforward control element 130 can be a constant gain or lead/lag compensator.

Another discovery is that vapor compression dynamics is closely related to outdoor ambient temperature. However, one set of controller min constants is not able to provide consistently well-controlled performance due to varying dynamics across a large range of operation ambient temperatures. In accordance with embodiments of the present disclosure, a gain scheduling control element 132 is implemented within the system controller 122 (as shown) or may be implemented as a separate component. The gain scheduling control element 132 is configured to make decisions regarding a best gain constant(s) given a current ambient/outside temperature (e,g., temperature at or around first unit 102). A gain constant of the feedforward controller 130 is sent from the gain scheduling control element 132 which is decided by a current ambient temperature. In some embodiments, the feedforward control element 130 and the gain scheduling control element 132 may be software implemented on memory that is executed by a processor of the system controller 122, and thus separate physical elements is not to be implied or limited.

Figure 2:
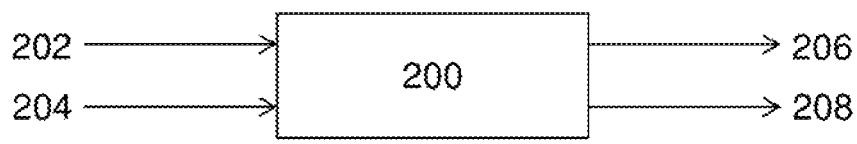
FIG. 2 is a schematic diagram of system inputs and outputs in accordance with an embodiment of the present disclosure.

Turning to FIG. 2, a schematic diagram of system inputs and outputs in accordance with an embodiment of the present disclosure is shown. Block 200 may represent heat pump vapor compressor cycle dynamics. Block 200 receives as input a compressor speed 202 (e.g., revolutions per minute) and a characteristic 204 of the first unit expansion valve 114 (e.g., steps or percentage). Outputs from block 200 include a supply/return air temperature 206 and a superheat 208.

Figure 3:
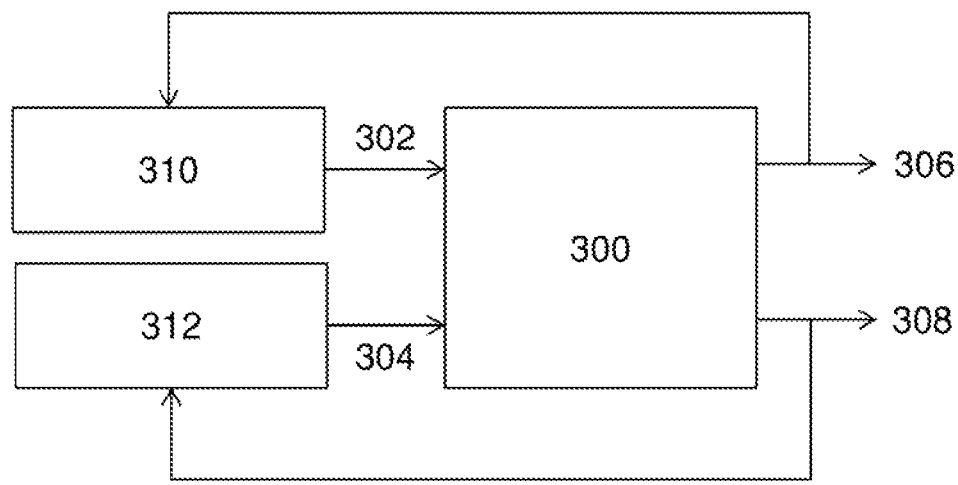
FIG. 3 is a schematic diagram of a feedback control loop in accordance with an embodiment of the present disclosure.

Turning now to FIG. 3, a schematic diagram of system inputs and outputs in accordance with an embodiment of the present disclosure and illustrating a feedback control loop is shown. Block 300 of FIG. 3 is similar to block 200 of FIG. 2 and may represent heat pump vapor compressor cycle dynamics. As shown, block 300 receives as input a compressor speed 302 and a characteristic 304 of the first unit expansion valve 114. Outputs from block 300 include a supply/return air temperature 306 and a superheat 308. Further, as schematically shown, the outputs 306, 308 are fed back to aspects of the compressor and the first unit expansion valve to enable dynamic feedback control, with the supply/return air temperature 306 being fed back to a capacity control 310 associated with the compressor and the superheat 308 being fed back to a superheat control 312 of the first unit expansion valve.

Figure 4:
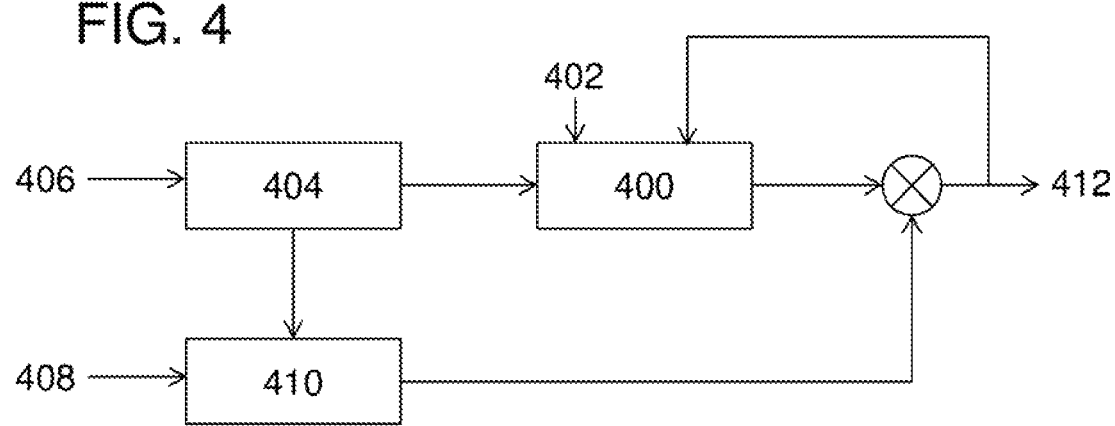
FIG. 4 is a schematic diagram of a heat pump system control process in accordance with an embodiment of the present disclosure.

Turning now to FIG. 4, as schematic diagram of system inputs and outputs in accordance with an embodiment of the present disclosure and illustrating a feedforward control loop is shown. The schematic diagram of FIG. 4 illustrates a diagram of an electric expansion valve PID controller with various inputs and outputs. The diagram of FIG. 4 is a superheat control scheme in accordance with an embodiment of the present disclosure.

As shown in FIG. 4, a PID control element 400 receives an error signal 402 and input from a gain scheduling 404.

For example, the error signal may be a value based on a setpoint and superheat feedback (e.g., error signal setpoint superheat feedback). Gain scheduling can include a set of parameter constants that are a function of ambient temperatures. As such, the gain scheduling 404 receives as input an outdoor ambient temperature 406. A compressor speed 408 is input into a feedforward control element 410. The feedforward control element 410 also receives as input information from the gain scheduling 404. The output of the PID control element 400 and the feedforward control element 410 are combined to generate an output as a first unit expansion valve opening command 412. The first unit expansion valve opening command 412 is fed back into the PID control element 400.

The superheat control scheme described above with respect to FIG. 4 includes a feedback loop (e.g., first unit expansion valve opening command 412), feedforward control (e.g., from feedforward control element 410), and gain scheduling (e.g., gain scheduling 404) allows the first unit expansion valve to act fast enough to control the superheat as well as keep any excessive amount of charge from entering the accumulator.

As noted above, wider current feedback control operations, too much charge may enter the accumulator during a heating mode of operation, which can significantly reduce efficiency of the system. Condensation within in the accumulator is avoided by keeping a positive superheat liquid, but at the same time keeping a low superheat maximizes efficiency. Accordingly, a balance between the two considerations should be maintained.

As provided herein, an improved control system is provided that includes a PID controller with detailed tailoring for heat pump application with gain scheduling and feedforward techniques. Embodiments provided herein enable a systematic solution to existing issues related to control of expansion valves (e.g., flooding, etc).

In accordance with some embodiments, the gain scheduling (e.g., gain scheduling 404 in FIG. 4) does not employ constants. Rather, the values of the gains for the PID controller are varied based on conditions defined by ambient/outside air temperature(s) as the dynamics of the vapor compression cycle do. Accordingly, performance can be optimized based on ambient temperatures.

With respect to feedforward terms of the present disclosure, such as generated by the feedforward control element 410 shown in FIG. 4, such term can enable anticipatory response of the system. For example, while the PID loop in the system controller is reactive, the feedforward term is anticipatory. As noted above, a change in compressor speed can have a dynamic causal effect on superheat but this effect cannot be adequately compensated by the PID loop alone. This is because the dynamic effect of a compressor speed change is much faster than the reactive capability of the PID loop. Therefore, the feedforward term, which is a function of compressor speed in various embodiments of the present disclosure, anticipates the effect on superheat due to a changing compressor speed and adds an adjustment to a position or open-state of the first unit expansion valve. The feedforward term can minimize the effect on superheat and keep the superheat closer to a target value.

It has been realized through both experimental study and theoretical study (e.g., through analysis and simulation) that an excessive charge enters the accumulator when the compressor speed changes, which also causes the superheat to change if not well compensated by the system controller. Once the charge enters the accumulator, it can be very hard to get the charge out of the accumulator given system setups position and/or operation of sensors, actuators, etc.). The more charge that enters the accumulator, the less charge that is actively available to participate in a vapor compressor cycle, and therefore the system efficiency will be reduced.

Advantageously, by implementing a control design as provided herein, the first unit expansion valve is well-controlled to move fast enough so as to prevent charge from entering the accumulator. At the same time, the control design enables compensation for any disturbance caused by compressor speed changes. Accordingly, operational efficiency improvements may be realized. For example, initial simulation results demonstrated a 10% COP (coefficient of performance) improvement under the simulated operational conditions. Further, system reliability may be improved. For example, improved superheat control by the control design as provided herein can reduces the risk of inverter trip due to high currents (e.g., high discharge pressures lead to high torque, which leads to high motor current).

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A heat pump system comprising:
   a first unit having a first unit heat exchanger, a compressor, an accumulator, and a first unit expansion valve;
   a second unit fluidly connected to the first unit by piping, the second unit having a second unit heat exchanger; and
   a system controller, the system controller having (I) a PID control element receiving as inputs (i) gain scheduling, (ii) an error signal, and (iii) feedback relating to an opening command of the first unit expansion valve, and (II) a feedforward control element generating a feedforward term that is combined with an output of the PID control element to generate the opening command of the first unit expansion valve,
   wherein the system controller controls an opening of the first unit expansion valve using the opening command of the first unit expansion valve,
   wherein the gain scheduling is based upon an ambient temperature and the inputs received at the PID control element from the gain scheduling comprise one or more gain constants, and wherein the error signal is a value based on a setpoint and a superheat feedback such that the error signal equals the setpoint minus the superheat feedback.

2. The heat pump system of claim 1, wherein the first unit expansion valve is an electric expansion valve.

3. The heat pump system of claim 1, wherein the second unit further comprises a second unit expansion valve.

4. The heat pump system of claim 3, wherein the second unit expansion valve is a thermostatic expansion valve.

5. The heat pump system of claim 1, wherein the first unit and the second unit are arranged in a common enclosure.

6. The heat pump system of claim 1, wherein the feedforward control element receives a compressor speed as an input.

7. A method of controlling a heat pump system, the method comprising:
   receiving, at a PID control element, (i) gain scheduling inputs, (ii) an error signal, and (iii) feedback related to an opening command of a first unit expansion valve;
   generating a feedforward term at a feedforward control element;
   combining the feedforward term with an output of the PID control element to generate the opening command of the first unit expansion valve; and
   controlling an opening or closing of the first unit expansion valve based on the opening command of the first unit expansion valve,
   wherein the gain scheduling inputs are based upon an ambient temperature and comprise one or more gain constants, and
   wherein the error signal is a value based on a setpoint and a superheat feedback such that the error signal equals the setpoint minus the superheat feedback.

8. The method of claim 7, wherein the gain scheduling input is based on an outdoor ambient temperature.

9. The method of claim 7, wherein the feedforward term is based on a compressor speed.

* * * * *